United States Patent
Chang et al.

(10) Patent No.: US 8,277,702 B2
(45) Date of Patent: Oct. 2, 2012

(54) NEAR INFRARED ABSORBING AGENT AND NEAR INFRARED ABSORBING FILM

(75) Inventors: Chao-Ching Chang, Tu-Chen (TW); Ying-Shiou Chen, Taipei (TW); Kwo-Hwa Fang, Pan-Chiao (TW)

(73) Assignee: Taiwan Textile Research Institute, Tu-Chen, Taipei Hsien (TW)

( * ) Notice: Subject to any disclaimer, the term of this patent is extended or adjusted under 35 U.S.C. 154(b) by 89 days.

(21) Appl. No.: 12/648,678

(22) Filed: Dec. 29, 2009

(65) Prior Publication Data

US 2011/0155974 A1   Jun. 30, 2011

(51) Int. Cl.
- *F21V 9/04* (2006.01)
- *F21V 9/06* (2006.01)
- *G02B 5/22* (2006.01)
- *G02B 5/26* (2006.01)
- *C01G 39/00* (2006.01)
- *C01G 41/00* (2006.01)

(52) U.S. Cl. ............... 252/587; 252/301.36; 252/301.5; 252/500; 264/1.1; 264/171.25; 423/594.13; 423/606; 427/160; 428/690; 501/1

(58) Field of Classification Search .................. 252/587, 252/301.36, 301.5, 500; 501/1; 264/1.1, 264/171.25; 423/440, 409, 594.13, 606; 75/623; 427/160; 428/690
See application file for complete search history.

(56) References Cited

U.S. PATENT DOCUMENTS

| | | | |
|---|---|---|---|
| 3,407,032 A * | 10/1968 | Ziering | ............ 423/606 |
| 2006/0178254 A1 * | 8/2006 | Takeda et al. | ........... 501/1 |
| 2007/0187653 A1 * | 8/2007 | Takeda et al. | ........... 252/500 |

FOREIGN PATENT DOCUMENTS

SU   1237718 A1 *   4/1984

* cited by examiner

*Primary Examiner* — Bijan Ahvazi (74) *Attorney, Agent, or Firm* — Thomas, Kayden, Horstemeyer & Risley, LLP (57) ABSTRACT

Disclosed herein is a method for preparing a near infrared absorbing agent. The method includes admixing tungsten trioxide and a reducing agent in water and allowing for a partial reduction of the tungsten trioxides to yield the near infrared absorbing agent.

10 Claims, 9 Drawing Sheets

NEAR INFRARED ABSORBING AGENT AND NEAR INFRARED ABSORBING FILM

BACKGROUND

1. Field of Invention

The present invention relates to a near infrared (NIR) absorbing agent.

2. Description of Related Art

Tungsten bronzes $M_xWO_3$ ($M=Li^+, Na^+, K^+, Rb^+, Cs^+$) are known to possess a satisfactory absorption of NIR light (having a wavelength between about 750 nm to about 1400 nm) while retaining a high transmittance of visible light (having a wavelength between about 380 nm to about 750 nm).

However, conventional methods for preparing tungsten bronze usually involve an annealing step at a temperature higher than 300° C. to produce the crystalline products that exhibit desirable NIR absorption. High temperature annealing would usually raise the manufacturing cost and is undesirable.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one aspect, the present invention is directed to a method for preparing a near infrared (NIR) absorbing agent.

According to one embodiment of the present invention, the method includes the step(s) as follows. Tungsten trioxide and a reducing agent are admixed in water to allow a partial reduction of the tungsten trioxides thereby yielding the near infrared absorbing agent.

In another aspect, the present invention is directed to a method for preparing a near infrared absorbing film.

According to one embodiment of the present invention, the method includes the steps as follows. First, near infrared absorbing agents prepared in accordance with the above-mentioned aspect/embodiment(s) of the present disclosure are dissolved in a polyacrylic acid aqueous solution. Thereafter, the polyacrylic acid aqueous solution is coated on a substrate and a film formation is allowed to take place thereby producing the near infrared absorbing film.

In yet another aspect, the present invention is directed to a near infrared absorbing film.

According to one embodiment of the present invention, the film comprises a polyacrylic acid matrix and a plurality of near infrared absorbing agents distributed therewithin. The plurality of near infrared absorbing agents is prepared in accordance with the above-mentioned aspect/embodiment(s) of the present disclosure. The film has a near infrared absorbance and a visible-light absorbance, and the near infrared absorbance is greater than the visible-light absorbance.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In one aspect, the present invention is directed to a method for preparing a near infrared (NIR) absorbing agent.

According to one embodiment of the present invention, the method includes the step(s) as follows. Tungsten trioxide and a reducing agent are admixed in water to allow a partial reduction of the tungsten trioxides thereby yielding the near infrared absorbing agent.

According to the embodiment of the present disclosure, the tungsten trioxide may be hydrated tungsten trioxide, examples of which may include, but are not limited to tungstite ($WO_3.H_2O$), meymacite ($WO_3.2H_2O$) and hydrotungstite ($H_2WO_4$).

In optional embodiments, the tungsten trioxide is in a form of powders with a diameter of about 50 to about 500 nm. For example, the diameter of the tungsten trioxide may be about 50, 55, 60, 70, 80, 90, 100, 150, 200, 250, 300, 350, 400, 450, or 500 nm.

In optional embodiments, the tungsten trioxide is hydrated tungsten trioxide prepared by a method comprising the steps as follows. In a container charged with nitrogen, about 0.2-0.5 M $Na_2WO_4.2H_2O$ aqueous solution and HCl are admixed to form a reaction system, wherein HCl is added in an amount such that the reaction system has a pH of about 1 to about 7. The reaction system is maintained at a temperature of about −10° C. to about 10° C. to effect the formation of hydrated tungsten trioxide.

Specifically, the pH of the reaction system can be maintained at about 1, 1.5, 2, 2.5, 3, 3.5, 4, 4.5, 5, 5.5, 6, 6.5 or 7. The temperature of the reaction system may be kept at about −10, −9, −8, −7, −6, −5, −4, −3, −2, −1, 0, 1, 2, 3, 4, 5, 6, 7, 8, 9 or 10° C. The volumetric molar concentration of the $Na_2WO_4.2H_2O$ present in the aqueous solution may be about 0.2, 0.3, 0.4, or 0.5 M.

Generally, the as-produced powders would have a diameter of about 50 to about 500 nm. As such, it is suitable to be used to prepare the NIR absorbing agent in accordance with the present aspect.

In the present disclosure, the term "partial reduction" refers to a condition where only a portion of the tungsten trioxides are reduced to tungsten oxides while the other portion of the tungsten trioxides are not reduced. In this case, the valance m of the (non-reduced) tungsten trioxide is 6+, while the valance n of the reduced tungsten oxide is $5 \leq n < 6$. For example, valance n of the reduced tungsten oxide may be about 5, 5.1, 5.2, 5.3, 5.4, 5.5, 5.6, 5.7, 5.8, or 5.9. In some embodiments, valance n of the reduced tungsten oxide may be about 5, 5.25, 5.33, 5.5, 5.66, or 5.75.

In the present disclosure, the product of the partially reduction process of the tungsten trioxides is a mixture of the tungsten (VI) trioxides (or tungsten trioxides, for the sake of brevity) and reduced tungsten oxides. In this context, the mixture may also be referred to as mixed-valent tungsten (VI/V) oxides.

It is known that tungsten (VI) trioxides may exhibit desirable UV absorbance, whereas the visible light absorbance and NIR absorbance thereof are less than 10%, respectively. In fact, tungsten (VI) trioxides are almost transparent to visible and NIR lights. On the other hand, the reduced tungsten oxides, similar to tungsten bronzes ($M_xWO_3$, where $M=Li^+$, $Na^+$, $K^+$, $Rb^+$, $Cs^+$), may exhibit NIR absorbing efficacy. As such, the mixed-valent tungsten (VI/V) oxides may exhibit the UV and NIR absorbing efficacies at the same time.

Hence, according to the principles and spirits of the present disclosure, it is important to control the reducing condition so as to yield a near infrared absorbing agent that may exhibit both the UV and NIR absorbing efficacies. Generally, the reducing condition may be influenced by several factors, including but not limited to: the species, volume and concentration of the reducing agent, the reaction pH, and the concentration of the tungsten trioxide to be reduced.

For example, the examples of suitable reducing agent may include, but are not limited to sodium borohydride, lithium borohydride, potassium borohydride, zinc borohydride, copper borohydride, lithium aluminium hydride, ethanol and ethylene glycol.

In an illustrative embodiment where sodium borohydride is used as the reducing agent, a weight ratio of the tungsten trioxide to the sodium borohydride is about 5:1 to 20:1. For example, the weight ratio may be about 5:1, 6:1, 7:1, 8:1, 9:1, 10:1, 11:1, 12:1, 13:1, 14:1, 15:1, 16:1, 17:1, 18:1, 19:1 or 20:1.

In another illustrative embodiment where ethanol is used as the reducing agent, a weight ratio of the tungsten trioxide to the ethanol is about 1:3 to 1:5. In particular, the weight ratio may be about 1:3.1, 1:3.2, 1:3.3, 1:3.4, 1:3.5, 1:3.6, 1:3.7, 1:3.8, 1:3.9, 1:4, 1:4.1, 1:4.2, 1:4.3, 1:4.4, 1:4.5, 1:4.6, 1:4.7, 1:4.8, 1:4.9, or 1:5.

The method of the present aspect may be carried out at ambient temperatures, but the present method is not limited thereto. Said ambient temperatures are generally in a range of about 23-27° C. It should be noted that the reaction system uses water as its main solvent. Accordingly, the method may be carried out at a temperature range of about 0-100° C.

Furthermore, the method according to the present aspect is carried out without the application of an electric field. Hence, the method does not involve an electrochemical reaction.

It is also noted that the mixed-valent tungsten (VI/V) oxides thus obtained may exhibit both NIR absorbance and ultraviolet (UV) absorbance without the conventional annealing step. Conventional annealing step is usually carried out at a temperature higher than about 300° C. so as to obtain a crystalline product. In some embodiments of the present disclosure, the mixed-valent tungsten (VI/V) oxides may not undergo a heating process that is higher than 100° C.

The NIR absorbing agent (i.e., the mixed-valent tungsten (VI/V) oxides) thus obtained may be dissolved in water without being dissolved in other organic solvent first. Accordingly, the NIR absorbing agent is suitable for use in the preparation of an NIR absorbing film.

Therefore, in another aspect, the present invention is directed to a method for preparing a near infrared absorbing film.

According to one embodiment of the present invention, the method includes the steps as follows. First, near infrared absorbing agents prepared in accordance with the above-mentioned aspect/embodiment(s) of the present disclosure are dissolved in a polyacrylic acid aqueous solution. Thereafter, the polyacrylic acid aqueous solution is coated on a substrate and a film formation is allowed to take place thereby producing the near infrared absorbing film.

It should be noted that the NIR absorbing agents according to the first aspect of the present disclosure may be dissolved in water without being dissolved in other organic solvent first. Hence, in some embodiments of the present disclosure, the polyacrylic acid aqueous solution does not include any other organic solvent for dissolving the plurality of near infrared absorbing agents. It should be noted that, the polyacrylic acid in the solution is not used as a solvent for dissolving the NIR absorbing agents. It is of course possible that some variations may be made to these embodiments by adding additional organic components in the polyacrylic acid aqueous solution. However, as long as the presence of these organic components does not facilitate the dissolvation of the NIR absorbing agents in the polyacrylic acid aqueous solution, these variations do not depart from the spirit or scope of the present disclosure.

As described hereinbefore, the near infrared absorbing agent per se may exhibit both NIR and UV absorbing efficacies without the conventional annealing step. Accordingly, the UV absorbing film thus prepared may also exclude the conventional annealing step. However, it is possible to perform a heating process at a temperature lower than 100° C. during the film forming step to facilitate the removal of the solvent.

In yet another aspect, the present invention is directed to a near infrared absorbing film.

According to one embodiment of the present invention, the film comprises a polyacrylic acid matrix and a plurality of near infrared absorbing agents distributed therewithin. The plurality of near infrared absorbing agents is prepared in accordance with the above-mentioned aspect/embodiment(s) of the present disclosure. The film has a near infrared absorbance and a visible-light absorbance, and the near infrared absorbance is greater than the visible-light absorbance.

In the present disclosure, a term "total value" is used to describe the NIR absorbing and visible-light absorbing properties of a film. Total value is the value of the sum of the value of the NIR absorbance of a film and the value of the visible-light transmittance of the film.

Generally, light transmittance (T %) within a specified wavelength range can be determined by a spectrometer, and light absorbance within the same range is obtained by subtracting the light transmittance from 100%. Hence, for example, the visible-light absorbance (VIS Abs. %) of a film is obtained by subtracting a visible-light transmittance (VIS T %) thereof from 100%.

Accordingly, when a film has an NIR absorbance greater than the visible-light absorbance, the relationship of the NIR absorbance and visible-light absorbance may be expressed as the inequality equation I:

$$\text{NIR Abs. \%} > \text{VIS Abs. \%} \qquad \text{Equation I.}$$

The equation I is still true if "100%" is added to both sides of the inequality equation I:

$$100\% + \text{NIR Abs. \%} > 100\% + \text{VIS Abs. \%} \qquad \text{Equation II.}$$

The equation II is also true if "−VIS Abs. %" is added to both sides of the inequality equation II:

$$(100\% - \text{VIS Abs. \%}) + \text{NIR Abs. \%} > 100\% \qquad \text{Equation III.}$$

Equation III can be rewritten into equation IV:

$$\text{VIS T \%} + \text{NIR Abs. \%} > 100\% \qquad \text{Equation IV.}$$

Hence, it is concluded that when a film has an NIR absorbance greater than the visible-light absorbance, the sum of the VIS T % and NIR Abs. % of the film is greater than 100%. That is, the total value of the film is greater than 100.

Optionally, in some embodiments, the UV absorbance of the film may be greater than the visible-light absorbance of the film.

Some working examples according to embodiments of the present invention are provided hereinafter. The tungsten trioxides used in these examples were hydrated tungsten trioxide prepared by the method described hereinabove. Specifically, about 0.03 mole $Na_2WO_4 \cdot 2H_2O$ and about 2.5 ml of HCl were admixed with 100 ml of water in a container charged with nitrogen to form a reaction system. The reaction system was maintain at a temperature of about −5° C. to about 5° C. to effect the formation of hydrated tungsten trioxide as white precipitate. The resulting precipitate was collected and washed with 40 ml of iced water to yield the product.

In some examples, the product can be re-suspended in water for use in the following partially reduction process. Alternatively, in some other examples, the product can be dried in vacuo to yield the tungsten trioxide powders, which can be later suspended in water for use in the following partially reduction process.

The hydrated tungsten trioxides thus prepared were partially reduced in accordance with the aspect and embodiments described hereinabove to yield the NIR absorbing agents. The NIR absorbing agents were further used for making the NIR absorbing films in accordance with the aspect and embodiments described hereinabove. Spectrometer (Hitachi U-4100 spectrometer) was used to measure the light transmittance of the films in the wavelength range of 280-1100 nm so as to determine the UV (wavelength 280-380 nm) transmittance, visible-light (wavelength 380-750 nm) transmittance, and NIR (wavelength 750-1100 nm) transmittance of each film, respectively.

The amounts of the reducing agent and/or the polyacrylic acid used in each example and the results thereof are summarized in hereinafter.

COMPARATIVE EXAMPLES

Comparative Example 1

Figure 1:
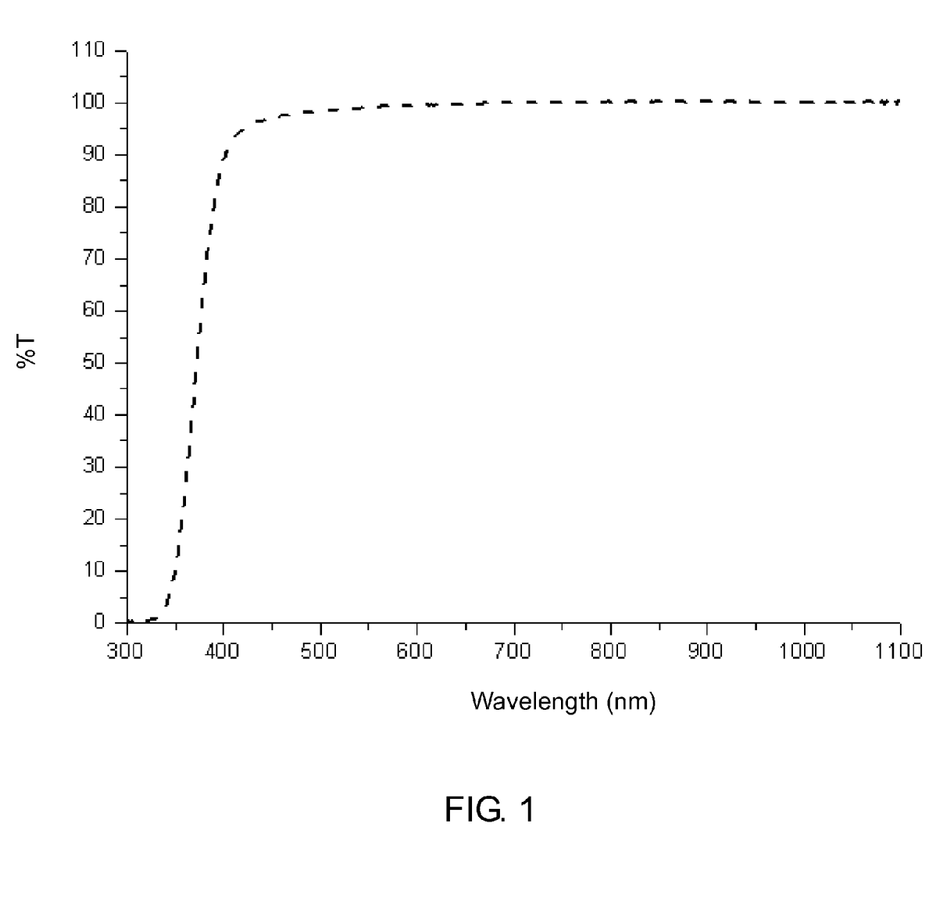
FIG. 1 is an absorbing spectrum according to a comparative example.

The hydrated tungsten trioxides prepared by the method described hereinabove were re-suspended in about 5 ml of water. The suspension (without being reduced) was then dissolved in about 2.86 g of about 35 wt % polyacrylic acid (PAA) solution. The solution was stirred at a temperature of about 75° C. for about 60 minutes. Thereafter, about 1 ml of the solution was sprayed over a glass substrate, and the substrate was baked at about 60° C. for about 60 minutes to allow the film formation. The film was analyzed with the spectrometer, and the light absorbing spectrum of the film of comparative example 1 is shown in FIG. 1. As can be seen in FIG. 1, the NIR transmittance of the film is almost 100%, and hence, the film of comparative example 1 exhibited substantially no NIR absorbing efficacy. The analysis also showed that a UV absorbance of the non-reduced film is about 73%, and the visible-light transmittance thereof is about 99%.

Comparative Example 2

Powders of $WO_3$ (about 1.16 g, 5 mmol) and about 0.60 g of NaOH (15 mmol) were ground together sufficiently to get $Na_2WO_4$/NaOH mixture. The mixture and about 50 ml distilled water were put into a 200 ml beaker and kept under constant stirring on a magnetic stirrer. Afterward, about 0.47 g (15 mmol) of $NaBH_4$ was dissolved in this solution, in which pH was about 13.5 that could suppress the rate of evolution of hydrogen from $NaBH_4$, and reduction of $Na_2WO_4$ did not occur kinetically. Hydrochloric acid (1.5 mol/l) was re-added into the beaker at a slow speed of about 0.5 drop per second to induce the reduction till pH of the reaction solution decreased to about 6.5. This procedure resulted in a dark brown gel in a blue sol medium. The gel was allowed to settle for 3 hours and then washed with warm distilled water three times. Finally, the solid product was filtered, washed with ethanol and dried in vacuum dry oven at ambient temperature to afford about 0.58 g of powders. The resulting powders were added into about 2.86 g of about 35 wt % PAA aqueous solution. However, it is observed that the powders were hardly dissolved in the PAA solution. Hence, the resulting powder is not suitable to be used in the method for preparing a near infrared absorbing film according to the present disclosure. Moreover, the XRD analysis showed that the resulting powders were amorphous.

Example 1

Working Example 1A

The hydrated tungsten trioxides prepared by the method described hereinabove were re-suspended in about 5 ml of water. About 0.5 ml of about 1 wt % NaBH4 aqueous solution was added into the suspension, and the suspension was stirred at 400 rpm for about 10 minutes so that the tungsten trioxides are partially reduced. Thereafter, about 8.22 g of PAA and about 22 ml of water were added into the solution, and the solution was stirred at 75° C. for about 60 minutes. The film formation step was carried out in the way similar to the comparative example 1.

Working Example 1B

The hydrated tungsten trioxides prepared by the method described hereinabove were re-suspended in about 5 ml of water and vortexed at about 2000 rpm for about 10 minutes. After the removal of the water in the upper layer, 40 ml of iced water was added and vortexed at about 2000 rpm for about 10 minutes. The resulting precipitate was dried in vacuo in a vacuum dry oven for a day to yield the powders. 0.1 g of the resulting powders was added into about 1 ml of about 1 wt % $NaBH_4$ aqueous solution, and the reaction system was stirred at about 400 rpm for about 10 minutes so that the tungsten trioxides are partially reduced. Thereafter, about 8.22 g of PAA and about 22 ml of water were added into the solution, and the solution was stirred at about 75° C. for about 60 minutes. The film formation step was carried out in the way similar to the comparative example 1.

Figure 2:
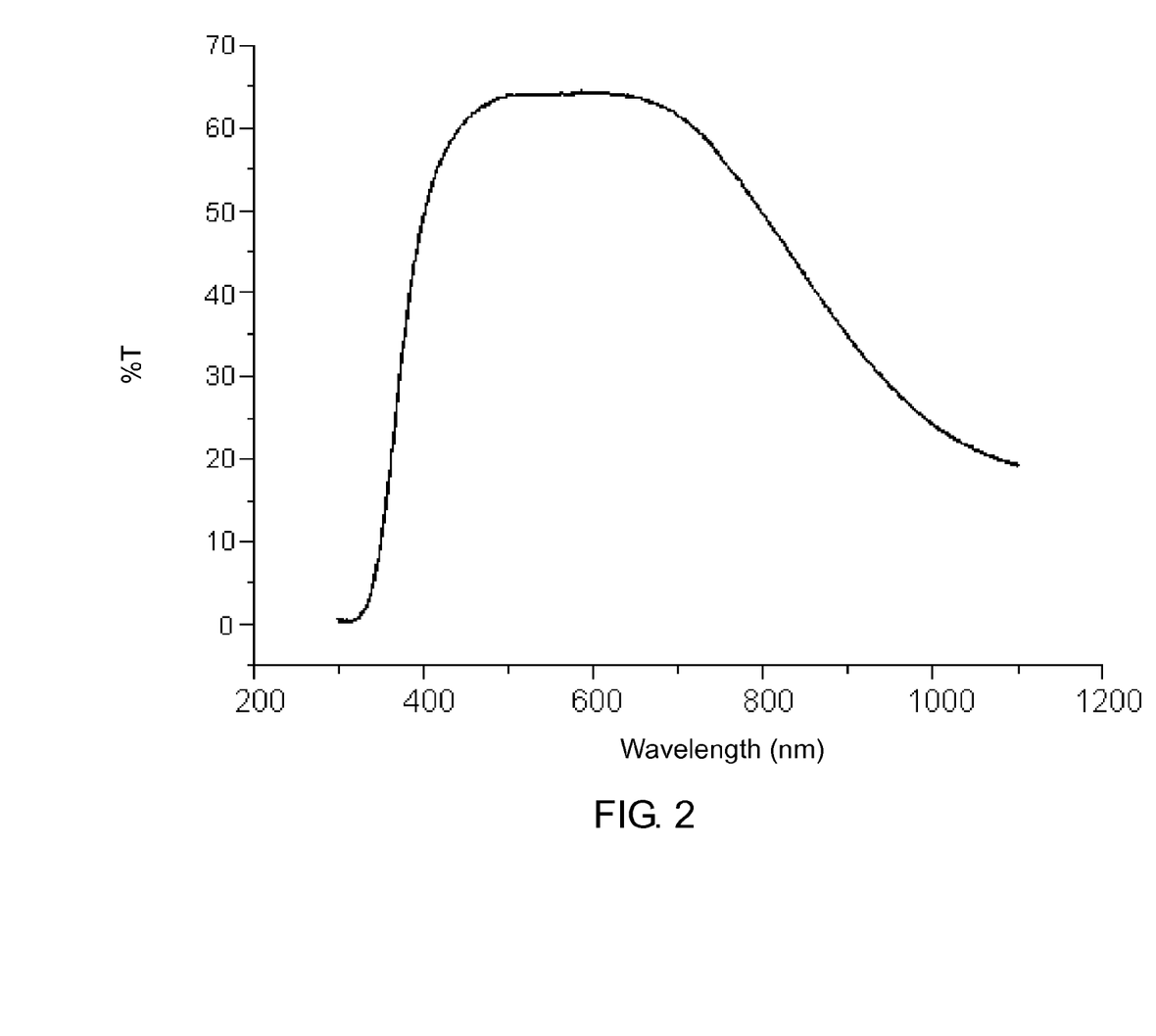
FIG. 2 is an absorbing spectrum according to working example 1A of the present disclosure.
Figure 3:
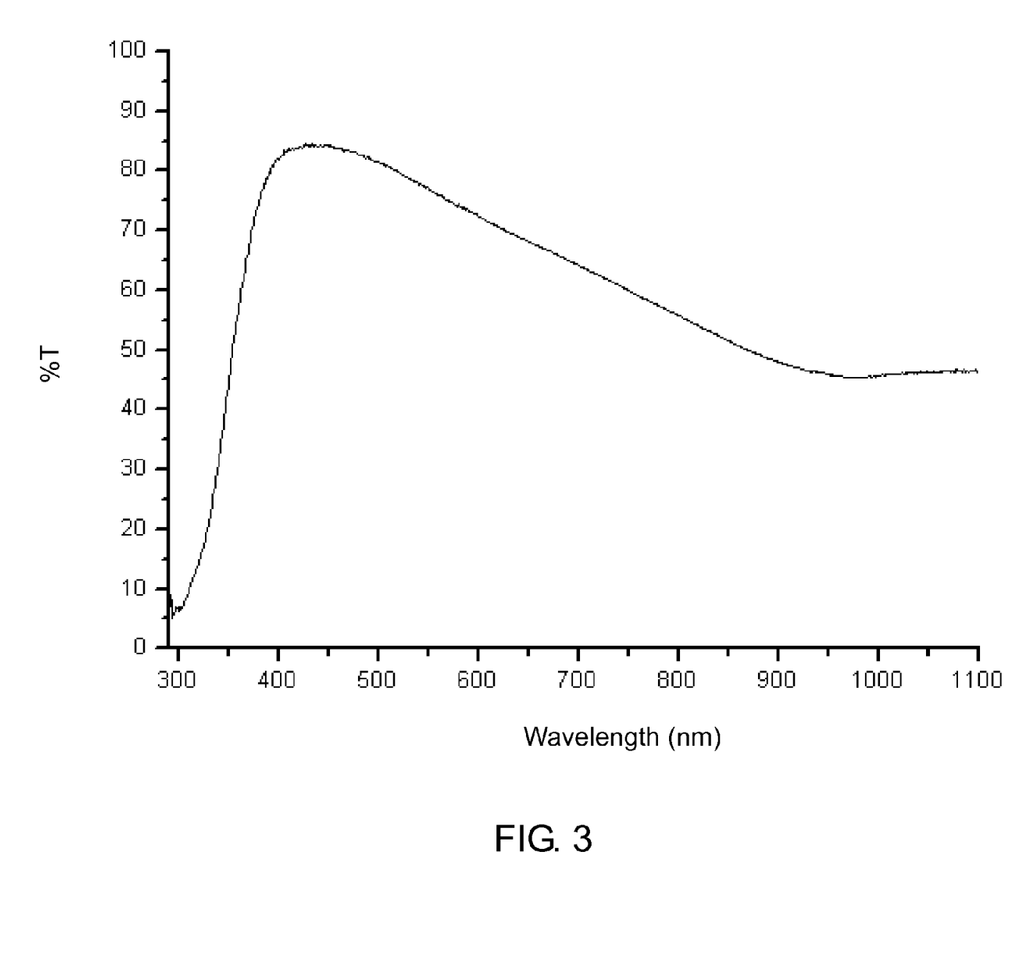
FIG. 3 is an absorbing spectrum according to working example 1B of the present disclosure.

The light absorbing spectrums of the film of working examples IA and IB are shown in FIG. 2 and FIG. 3, respectively, and the results are summarized in Table 1.

TABLE 1

| Example | UV Absorbance (%) | VIS Transmittance (%) | NIR Absorbance (%) | Total Value |
| --- | --- | --- | --- | --- |
| Example 1A | 83 | 62 | 63 | 125 |
| Example 1B | 72 | 65 | 77 | 142 |

Example 2

Figure 4:
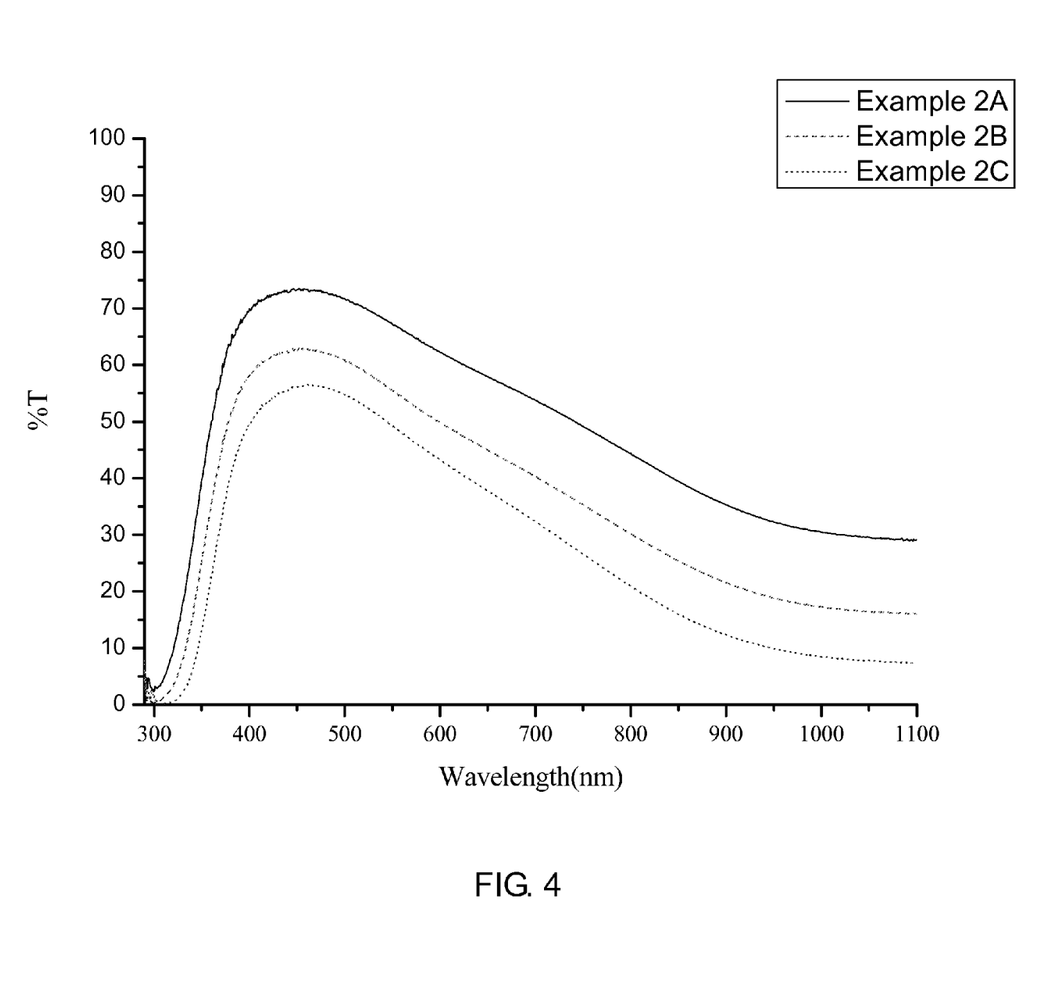
FIG. 4 is an absorbing spectrum according to working examples 2A-2C of the present disclosure.
Figure 5:
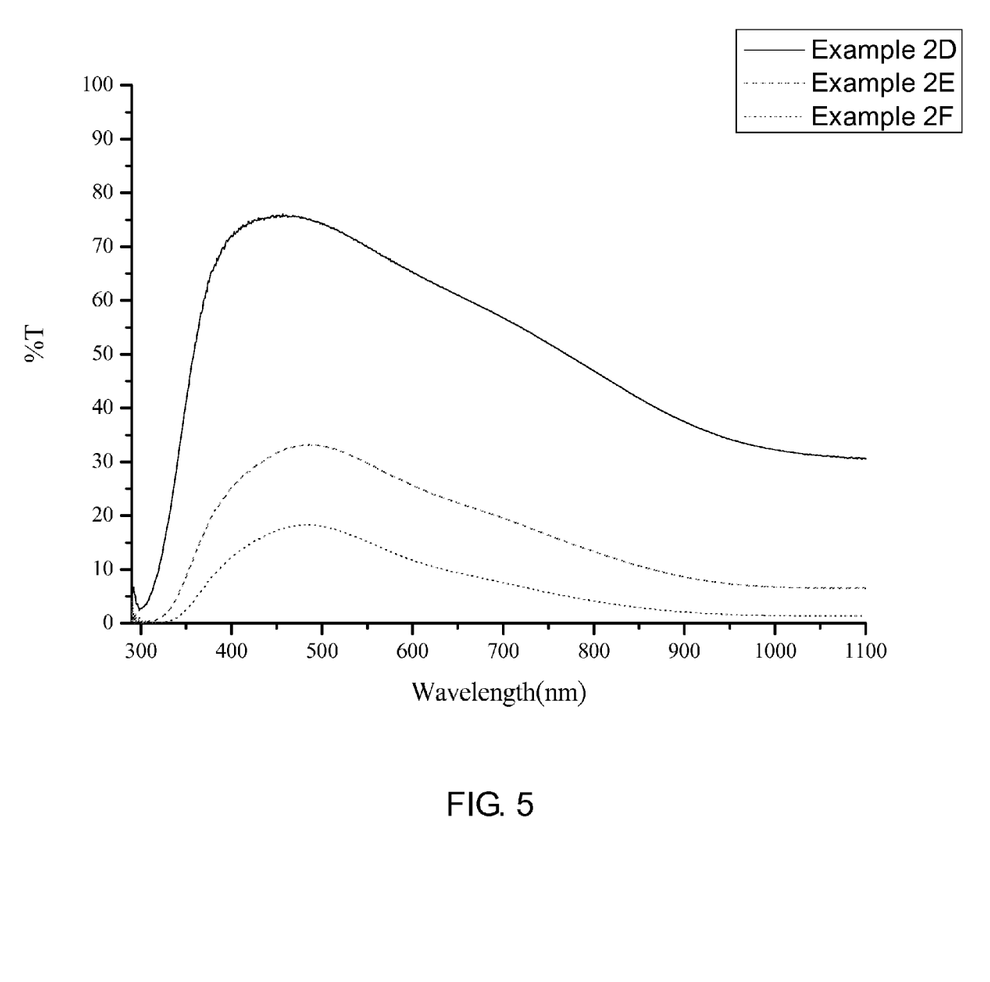
FIG. 5 is an absorbing spectrum according to working examples 2D-2F of the present disclosure.
Figure 6:
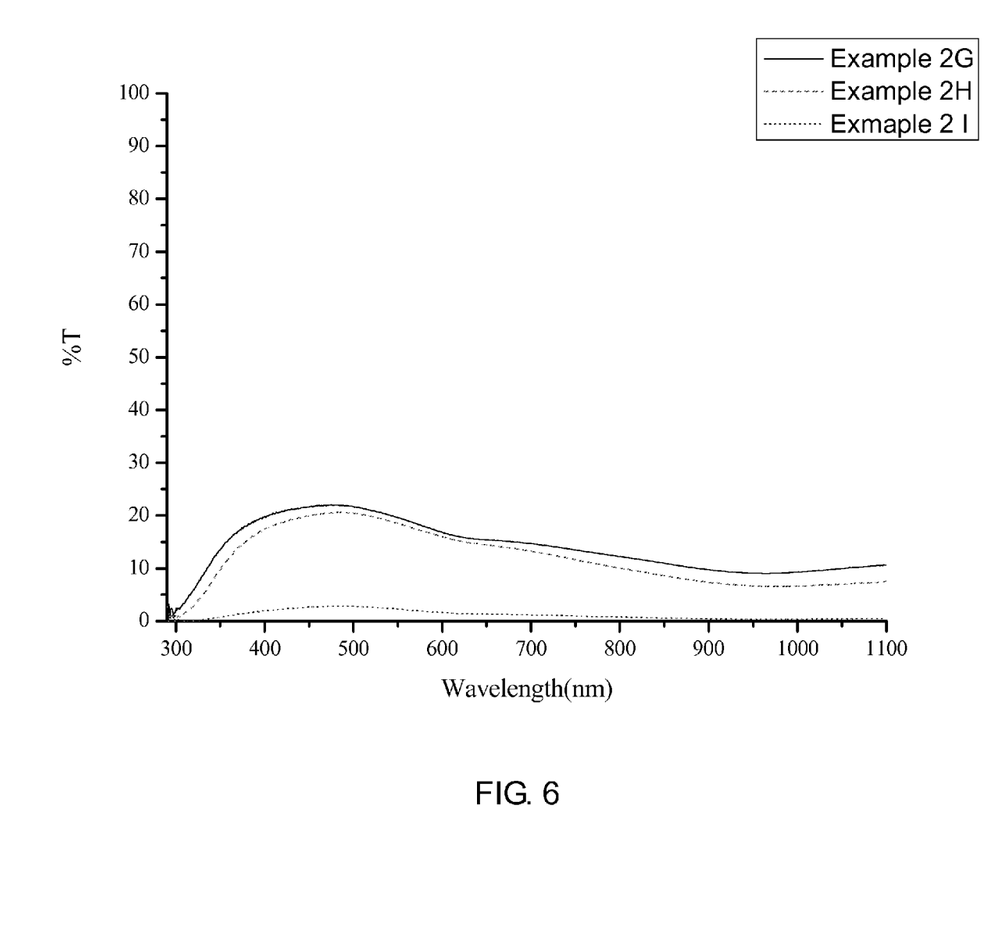
FIG. 6 is an absorbing spectrum according to working examples 2G-2I of the present disclosure.

Working examples 2A-2I were similar to working example 1B except the volume of the about 1 wt % reducing agent (NaBH$_4$) and water were different, and further, about 2.86 g of about 35 wt % PAA solution was used for the film formation. In addition, the films of examples 2A, 2D and 2G were made from about 0.3 ml of film forming solution; the films of examples 2B, 2E and 2H were made from about 0.5 ml of film forming solution; whereas the films of examples 2C, 2F and 2I were made from about 1.0 ml of film forming solution. The amount of the reducing agent and the results of the light absorbing analysis are summarized in Table 2, and the light absorbing spectrums of the film of working examples 2A-2I are shown in FIG. 4, FIG. 5, and FIG. 6.

TABLE 2

| Example | Reducing Agent/water (ml/ml) | UV Absorbance (%) | VIS Transmittance (%) | NIR Absorbance (%) | Total Value |
| --- | --- | --- | --- | --- | --- |
| Example 2A | 0.5/2.045 | 64 | 63 | 65 | 128 |
| Example 2B | 0.5/2.045 | 75 | 50 | 79 | 129 |
| Example 2C | 0.5/2.045 | 85 | 43 | 88 | 131 |
| Example 2D | 1.0/1.55 | 65 | 65 | 63 | 128 |
| Example 2E | 1.0/1.55 | 91 | 25 | 91 | 116 |
| Example 2F | 1.0/1.55 | 95 | 12 | 98 | 110 |
| Example 2G | 2.0/0.56 | 88 | 21 | 90 | 111 |
| Example 2H | 2.0/0.56 | 91 | 16 | 92 | 108 |
| Example 2I | 2.0/0.56 | 76 | 2 | 99 | 101 |

Example 3

Figure 7:
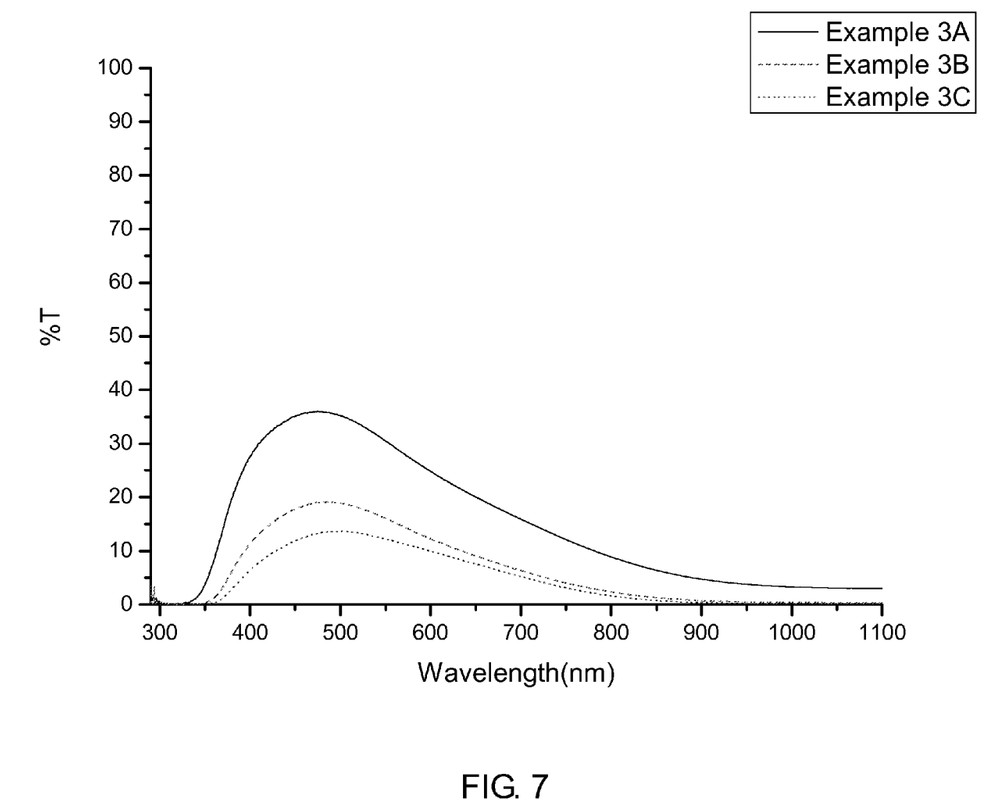
FIG. 7 is an absorbing spectrum according to working examples 3A-3C of the present disclosure.
Figure 8:
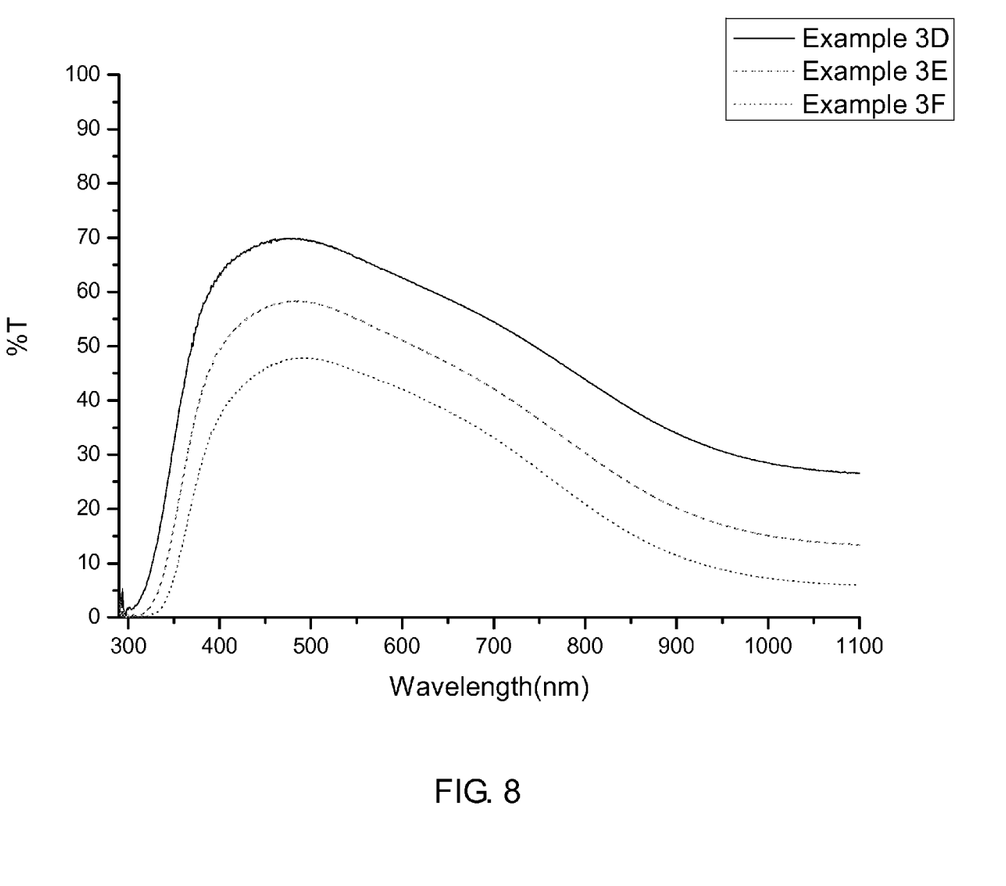
FIG. 8 is an absorbing spectrum according to working examples 3D-3F of the present disclosure.
Figure 9:
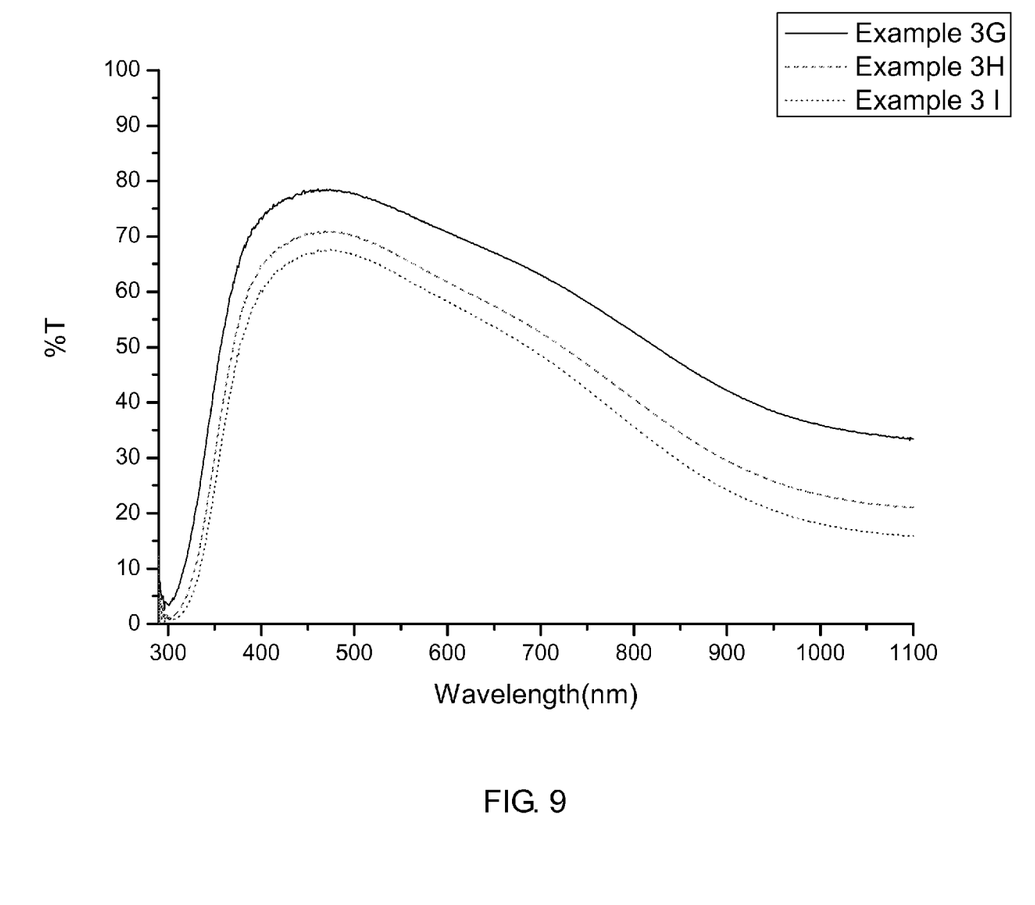
FIG. 9 is an absorbing spectrum according to working examples 3G-3I of the present disclosure.

Working examples 3A-3I were similar to working example 1B except the volume of the about 35 wt % PAA solution and water were different. In addition, the films of examples 3A, 3D and 3G were made from about 0.3 ml of film forming solution; the films of examples 3B, 3E and 3H were made from about 0.5 ml of film forming solution; whereas the films of examples 3C, 3F and 3I were made from about 1.0 ml of film forming solution. The volume of the PAA solution and the results of the light absorbing analysis are summarized in Table 3, and the light absorbing spectrums of the film of working examples 3A-3I are shown in FIG. 7, FIG. 8, and FIG. 9.

TABLE 3

| Example | PAA solution/ water (g/ml) | UV Absorbance (%) | VIS Transmittance (%) | NIR Absorbance (%) | Total Value |
| --- | --- | --- | --- | --- | --- |
| Example 3A | 1.43/0.48 | 91.0 | 24.9 | 95.2 | 120.1 |
| Example 3B | 1.43/0.48 | 93.5 | 12.0 | 99.2 | 111.2 |
| Example 3C | 1.43/0.48 | 97.7 | 8.9 | 99.5 | 108.4 |
| Example 3D | 4.29/2.62 | 74 | 62 | 67 | 129 |
| Example 3E | 4.29/2.62 | 80 | 50 | 81 | 131 |
| Example 3F | 4.29/2.62 | 88 | 40 | 89 | 129 |
| Example 3G | 5.72/3.69 | 67 | 70 | 59 | 129 |
| Example 3H | 5.72/3.69 | 69 | 61 | 72 | 133 |
| Example 3I | 5.72/3.69 | 78 | 57 | 77 | 134 |

Example 4

Working examples 4A-4D employs ethanol as the reducing agent. Specifically, about 0.03 mole Na$_2$WO$_4$.2H$_2$O and about 2.5 ml of HCl were admixed with about 75 ml of water and about 25 ml of ethanol in a container charged with nitrogen to form a reaction system. The reaction system was maintain at a temperature of about −5° C. to about 5° C. to effect the formation of partially reduced tungsten trioxide as white precipitate. The resulting precipitate was collected and washed with about 40 ml of iced water to yield the product. About 8.22 g of PAA was dissolved in about 22.8 ml of water, and then admixed with the resulting product. The system was vibrating in a water bath of about 100° C. for about 1 hour. Thereafter, about 0.5 ml (Examples 4A and 4B) and 1 ml (Examples 4C and 4D) of the solution were respectively sprayed over a glass substrate, and the substrate was baked at about 60° C. for about 60 minutes to allow the film formation. The film of examples 4B and 4D were further irradiated by a UV lamp (wavelength: 365 nm) for about 60 minutes. The results of the light absorbing analysis are summarized in Table 4.

TABLE 4

| Example | UV Absorbance (%) | VIS Transmittance (%) | NIR Absorbance (%) | Total Value |
| --- | --- | --- | --- | --- |
| Example 4A | 81.2 | 94 | 4.7 | 98.7 |
| Example 4B | 82 | 75.8 | 52.1 | 127.9 |
| Example 4C | 85.2 | 90 | 8.2 | 98.2 |
| Example 4D | 85 | 76.3 | 48.4 | 124.7 |

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:
1. A method for preparing a near infrared absorbing agent, comprising:
   admixing tungsten trioxide and a reducing agent in water, wherein the tungsten trioxide has a chemical formula of WO$_3$.H$_2$O or WO$_3$.2H$_2$O and allowing a partial reduction of the tungsten trioxides in the water to proceed at a temperature of 0-100° C. and thereby yielding a reduced tungsten oxide as the near infrared absorbing agent, wherein the valence of the tungsten in the reduced tungsten oxide is from 5 to less than 6, and wherein the reducing agent is selected from the group consisting of sodium borohydride, lithium borohydride, potassium borohydride, zinc borohydride, copper borohydride, lithium aluminium hydride, ethanol or ethylene glycol.

2. The method of claim 1, wherein the tungsten trioxide is in a form of powders having a diameter of about 50 to about 500 nm.

3. The method of claim 1, wherein the reducing agent is sodium borohydride, and a weight ratio of the tungsten trioxide to the sodium borohydride is about 5:1 to 20:1.

4. The method of claim 1, wherein the reducing agent is ethanol, and a weight ratio of the tungsten trioxide to the ethanol is about 1:3 to 1:5.

5. The method of claim 1, wherein the tungsten trioxide is prepared by a method comprising:

admixing about 0.2-0.5 M $Na_2WO_4 \cdot 2H_2O$ aqueous solution and HCl in a container charged with nitrogen to form a reaction system, wherein the HCl is added in an amount such that the reaction system has a pH of about 1 to about 7, and the reaction system is maintained at a temperature of about −10° C. to about 10° C. to effect the formation of the tungsten trioxide.

6. A method for preparing a near infrared absorbing film, comprising:

dissolving a plurality of near infrared absorbing agents in a polyacrylic acid aqueous solution, wherein the plurality of near infrared absorbing agents are prepared by the method of claim 1; and coating the polyacrylic acid aqueous solution on a substrate and allowing the polyacrylic acid aqueous solution to form the near infrared absorbing film.

7. The method of claim 6, wherein the method is characterized in not having an annealing step that is carried out at a temperature greater than 100° C.

8. The method of claim 6, wherein the polyacrylic acid aqueous solution does not include any other organic solvent for dissolving the plurality of near infrared absorbing agents.

9. A near infrared absorbing film, comprising:

a polyacrylic acid matrix; and a plurality of near infrared absorbing agents distributed within the polyacrylic acid matrix, wherein the near infrared absorbing agents are prepared by the method of claim 1, and the film has a near infrared absorbance and a visible-light absorbance, and the near infrared absorbance is greater than the visible-light absorbance.

10. The film of claim 9, wherein the film has an ultraviolet absorbance greater than the visible-light absorbance of the film.

* * * * *